Patented Jan. 2, 1940

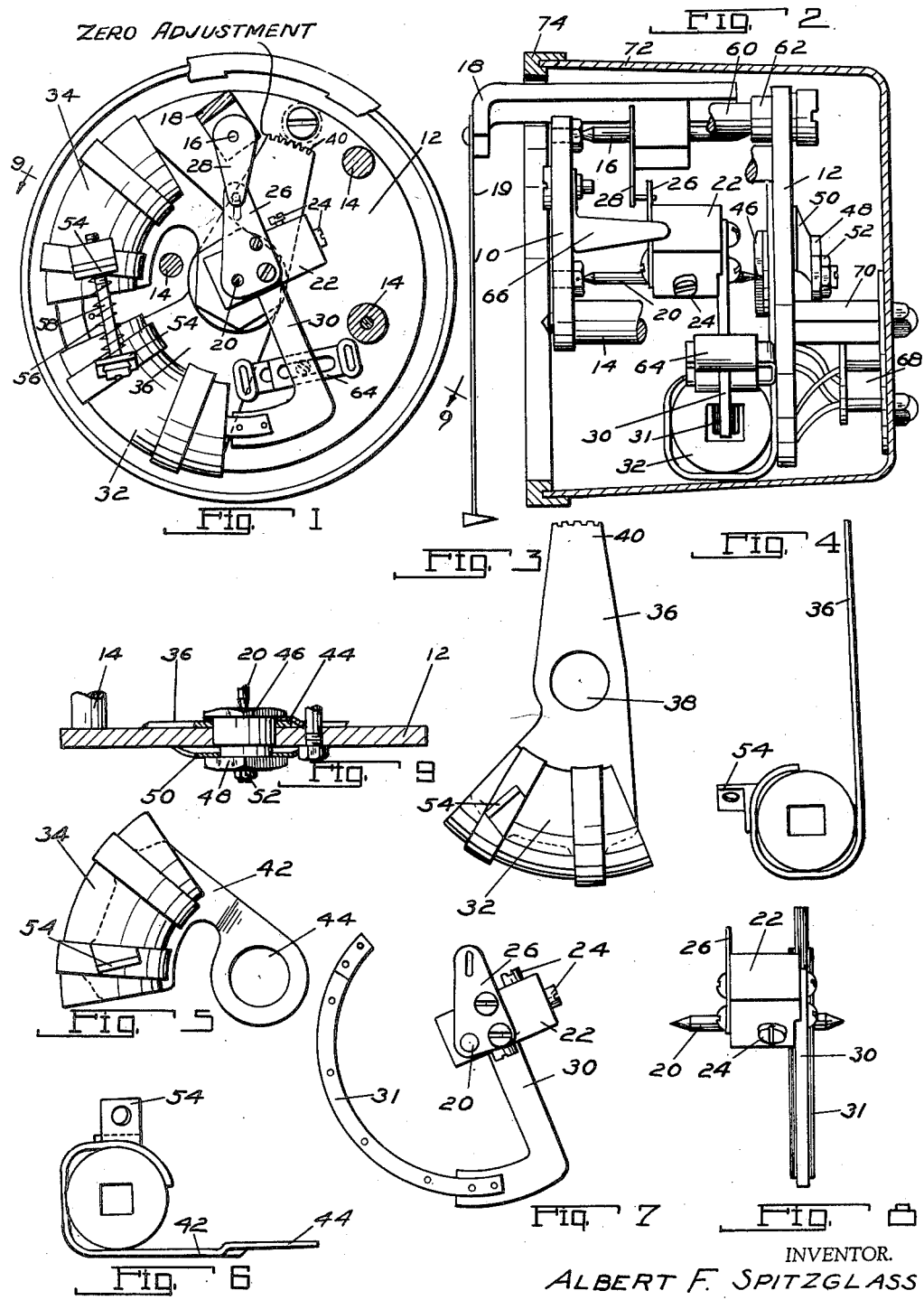

2,185,276

UNITED STATES PATENT OFFICE 2,185,276

INSTRUMENT

Albert F. Spitzglass, Chicago, Ill., assignor to Republic Flow Meters Company, Chicago, Ill., a corporation of Illinois Application December 19, 1936, Serial No. 116,837

11 Claims. (Cl. 171—95)

This invention relates to instruments and more particularly to indicating or recording instruments adapted to be operated by remote control.

One object of the invention is to provide an instrument which can be quickly and easily calibrated or adjusted.

Another object of the invention relates to the mounting of all of the operating parts of the instrument on a pair of spaced, rigidly connected plates which are preferably enclosed in a protective casing.

In one desirable arrangement the instrument includes a pair of parallel shafts rotatably mounted at their opposite ends on the spaced plates and operatively connected together as by means of a pin and slot connection. One of the shafts carries an operating arm for supporting and moving a pointer, recording pin or the like and the other shaft carries a curved armature adapted to swing as a movable core through two arcuate solenoid coils which are arranged end to end.

The coils are preferably carried by a movably mounted bracket pivoted about the axis of the said other shaft and suitable adjusting means is provided for the bracket to set the instrument at zero. In order to calibrate the mid-scale reading of the instrument, the two coils are preferably mounted on separate brackets adjustably connected together.

Other objects, advantages and novel features of the invention including desirable subcombinations and particular constructions will be apparent from the following description of the embodiment illustrated in the accompanying drawing, in which:

Figure 1 is a front view with parts removed of an instrument embodying the invention;

Figure 2 is a central vertical section of the instrument of Figure 1, with parts in elevation;

Figures 3 to 8 are detail views; and

Figure 9 is a partial section on the line 9—9 of Figure 1.

The instrument illustrated comprises a front plate 10 of approximately semi-circular shape rigidly secured to a back plate 12 by posts 14. A first shaft 16 is mounted in needle bearings on the plates 10 and 12 and carries an operating arm 18 which projects in front of and is swingable across the plate 10 to carry a recording pen 19 or the like. A second shaft 20 is similarly mounted in needle bearings on the plates 10 and 12 and lies parallel to the first shaft 16. The shaft 20 carries a mounting block 22 adapted to be balanced by balancing screws 24 and carrying a slotted plate 26. The shaft 16 carries a projection 28 having a pin adapted to project into the slot in the plate 26 to form a driving connection between the shafts 16 and 20.

An arm 30 is secured to the block 22 and carries an arcuate armature 31 formed of laminated iron strips or the like which is adapted to swing as a movable core through a pair of arcuate solenoid coils 32 and 34 which are curved about the axis of the shaft 20. The coil 32 is mounted on one end of a bracket 36 which has an opening 38 in its central portion by which it may be pivotally mounted on the plate 12 and whose opposite end is formed as a gear segment 40. The coil 34 is mounted on a second bracket 42 having an offset portion 44 formed with an opening for pivotal mounting concentrically with the opening 38.

The mounting of the brackets 36 and 42 is shown best in Figure 9 which shows an elongated nut 46 passing through the openings in the brackets and through the plate 12 and secured by a mating part 48 frictionally held by a spring disc 50 to prevent accidental loosening and to maintain a yielding pressure on the brackets 36 and 42. A jewel bearing 52 is carried centrally by the part 48 and supports one end of the shaft 20.

The brackets 36 and 42 carry projecting lugs 54 serving as seats for a compression spring 56 which surrounds a screw 58 passing through the lugs 54 and serving to draw them together. By adjusting the screw 58 the relative positions of the brackets and of the coils 32 and 34 can be adjusted to calibrate the instrument.

In order to set the instrument for zero, a shaft 60 is frictionally rotatably mounted in the plate 12 and carries a pinion 62 meshing with the gear segment 40. By turning the shaft 60 the bracket 36 can be turned to move both coils 32 and 34 as a unit, thereby to effect zero setting of the instrument.

Preferably a U-shaped bracket 64 is adjustably secured to the plate 12 with its legs lying on opposite sides of the arm 30 to limit its extreme positions. As a matter of convenience in handling the instrument a stamping 66 is frictionally pivoted on the plate 10 to engage the block 22 to hold the arm 30 in one of its extreme positions.

The coils 32 and 34 are adapted to be connected in a measuring circuit, for example, as described in Figures 14, 18 or 29 of my Patent No. 2,076,100 granted April 6, 1937, and for this purpose the coils are electrically connected to the four terminals of a socket 68. The socket 68 is supported by posts 10 projecting from the plate 12 which also serve as supports for a casing 72 enclosing the instrument and having a gasket 74 to seal against a mounting panel, as explained more fully in my patent referred to above.

In using the instrument in connection with a flow meter, for example, the coil 34, which may be called the current coil, is connected in series with the flowmeter to a source of electric power and the coil 32, which may be called the voltage coil, is connected directly across the source. The coil 32 provides a retarding or damping force and also serves to return the parts to zero position and variations in the flowmeter producing variations in the flow of current through the coil 34 cause the armature 31 to be deflected to produce a corresponding deflection of the operating arm 18. Since voltage fluctuations affect both coils alike they will be cancelled out and the instrument will not be affected thereby.

While one embodiment of the invention has been shown and described in detail it will be apparent that changes might be made therein and it is not intended that the scope of the invention shall be limited to the particular form shown or otherwise than by the terms of the appended claims.

What is claimed is:

1. An instrument unit comprising a pair of spaced rigidly connected supporting plates, a pair of parallel shafts mounted at their ends on said plates respectively, one of said shafts carrying an indicating arm swingable across and in front of one of the plates, an electric coil adjustably mounted on the other of said plates, means for adjusting said coil about the axis of the other shaft to set the instrument to zero, an armature carried by the other shaft to be affected by said coil thereby to oscillate the other shaft, and an operating connection between said shafts to turn said one shaft as the other shaft is turned.

2. An instrument unit comprising a pair of spaced rigidly connected supporting plates, a pair of parallel shafts mounted at their ends on said plates respectively, one of said shafts carrying an indicating arm swingable across and in front of one of the plates, a pair of solenoid coils arranged end to end on the other of said plates, means to adjust both of said coils bodily on said plate, and means to move one of said coils relatively to the other.

3. An instrument unit comprising a pair of spaced rigidly connected supporting plates, a pair of parallel shafts mounted at their ends on said plates respectively, one of said shafts carrying an indicating arm swingable across and in front of one of the plates, a pair of solenoid coils arranged end to end on the other of said plates, and means to move one of said coils relatively to the other to calibrate the instrument.

4. An instrument unit comprising a pair of spaced rigidly connected supporting plates, a pair of parallel shafts mounted at their ends on said plates respectively, one of said shafts carrying an indicating arm swingable across and in front of one of the plates, a pair of arcuate solenoid coils arranged end to end on the other of said plates and curving about the axis of said other shaft, a curved armature carried by said other shaft and swingable as a movable core in said coils, means to move said coils as a unit about the axis of said other shaft, and means to move one of the coils relatively to the other about the axis of said other shaft.

5. An instrument unit comprising a rotatably mounted shaft, means responsive to changes in a function of a controlling force, a bracket mounted for pivotal movement about the axis of said shaft and carrying said responsive means, means responsive to changes in another function of the controlling force, a second bracket mounted for angular adjustment about the axis of said shaft and carrying said last named responsive means, means carried by the shaft and jointly responsive to said responsive means to move the shaft, and means to adjust one of said brackets relative to the other to calibrate the instrument.

6. An instrument unit comprising a rotatably mounted shaft, means responsive to changes in a function of a controlling force, a bracket mounted for pivotal movement about the axis of said shaft and carrying said responsive means, means responsive to changes in another function of the controlling force, a second bracket mounted for angular adjustment about the axis of said shaft and carrying said last named responsive means, means carried by the shaft and jointly responsive to said responsive means to move the shaft, means adjustably connecting the second bracket to the first named bracket whereby said brackets may be adjusted to calibrate the instrument, and means to adjust the first bracket to set the instrument to zero.

7. An instrument unit comprising a rotatably mounted shaft, a pair of brackets separately mounted for pivotal movement about the axis of said shaft, a pair of solenoid coils mounted on said brackets respectively and curved about the axis of said shaft, a curved armature carried by said shaft and swingable as a movable core in said coils, and means to adjust the position of said brackets as a unit to set the instrument to zero.

8. An instrument unit comprising a rotatably mounted shaft, a pair of brackets separately mounted for pivotal movement about the axis of said shaft, a pair of solenoid coils mounted on said brackets respectively and curved about the axis of said shaft, a curved armature carried by said shaft and swingable as a movable core in said coils, and means to adjust the position of one of said brackets relative to the other to calibrate the instrument.

9. An instrument unit comprising a rotatably mounted shaft, a pair of brackets separately mounted for pivotal movement about the axis of said shaft, a pair of solenoid coils mounted on said brackets respectively and curved about the axis of said shaft, a curved armature carried by said shaft and swingable as a movable core in said coils, means to adjust the position of said brackets as a unit to set the instrument to zero, and means to adjust the position of one of said brackets relative to the other to calibrate the instrument.

10. An instrument comprising a pivotally mounted bracket, means at one end of the bracket for mounting a responsive element thereon, a second bracket pivotally mounted coaxially with the first bracket, said second bracket having means at one end for mounting a second responsive element thereon, means adjustably connecting said brackets whereby their relative angular positions may be varied, a shaft coaxial with the pivotal mountings of the brackets, and a member carried by the shaft and cooperating with the responsive elements to turn the shaft.

11. An instrument comprising a pivotally mounted bracket, means at one end of the bracket for mounting a responsive element thereon, a second bracket pivotally mounted coaxially with the first bracket, said second bracket having means at one end for mounting a second responsive element thereon, means adjustably connecting said brackets whereby their relative angular positions may be varied, means for adjusting the angular position of one of said brackets thereby to move both brackets as a unit, a shaft coaxial with the pivotal mountings of the brackets, and a member carried by the shaft and cooperating with the responsive elements to turn the shaft.

ALBERT F. SPITZGLASS.